United States Patent [19]

Güntherodt et al.

[11] 4,343,537
[45] Aug. 10, 1982

[54] ELECTRO-OPTICAL CELL

[75] Inventors: Hans-Joachim Güntherodt, Witterswil; Peter Pfluger, Lucern; Hans-Ulrich Künzi, Bottmingen, all of Switzerland

[73] Assignee: Hoffmann-La Roche Inc., Nutley, N.J.

[21] Appl. No.: 195,143

[22] PCT Filed: Oct. 16, 1979

[86] PCT No.: PCT/CH79/00135

§ 371 Date: Jun. 18, 1980

§ 102(e) Date: Jun. 17, 1980

[87] PCT Pub. No.: WO80/00880

PCT Pub. Date: May 1, 1980

[30] Foreign Application Priority Data

Oct. 18, 1978 [CH] Switzerland ............... 10777/78
Jul. 31, 1979 [CH] Switzerland ............... 7047/79

[51] Int. Cl.$^3$ .................................................. G02F 1/17
[52] U.S. Cl. ................................................... 350/357
[58] Field of Search ........................................ 350/357

[56] References Cited

U.S. PATENT DOCUMENTS 3,827,784 8/1974 Giglia et al. ............... 350/357
3,829,196 8/1974 Deb ............................ 350/357
3,971,624 7/1976 Bruesch et al.
4,041,220 8/1977 Armand.
4,060,311 11/1977 Green.
4,110,015 9/1978 Reddy.

OTHER PUBLICATIONS

Knowles, "Optical Regeneration of Aged WO$_3$ Electrochromic Cells", App. Phys. Lett., 31(12), Dec. 15, 1977, pp. 817–818.
Green, M., Thin Solid Films, vol. 50, No. 1, 145–150, (1978).
Boersma; M., Cat. Rev.-Sci. Eng., 10(2), 243–280, particularly 245–255, (1974).
Billaud et al., C. R. Acad. Sc. Paris, Series C-305, t. 281, (1975).

Primary Examiner—James W. Davie
Attorney, Agent, or Firm—Jon S. Saxe; Bernard S. Leon; George W. Johnston

[57] ABSTRACT

An electro-optical cell, more particularly for display purposes, which comprises a working electrode having an intercalatable layer structure, especially graphite, a counter-electrode, an ion conductor disposed between the two electrodes and, if desired, a reference electrode. On application of an electric voltage, ions from the ion conductor are inserted into the layer structure, whereby or visible, optical change on the surface of the electrode is effected.

24 Claims, 3 Drawing Figures

ELECTRO-OPTICAL CELL

DESCRIPTION OF INVENTION

The present invention relates to an electro-optical cell, more particularly for display purposes, comprising a working electrode having electrically controllable optical properties, a counter-electrode, an ion conductor disposed between the two electrodes, and means for applying an electric field or electric current. The cell may be provided with a reference electrode.

In electro-optical cells known as "electrochromic" cells, the electrochromic effect is as follows: When an electric field or electric current is applied, the absorption of transmitted light by an electrochromic layer is so altered that the layer can for example be switched from a state where it transmits light to a state where it is completely or partly opaque. Absorption by the electrochromic material is usually frequency-selective, so that coloured displays can be obtained. Electro-optical cells of the aforementioned kind, based on the electrochromic effect, have been described, for example by M. Green et al in "Solid Films", 38 (1976), 89–100; J. F. Chang et al, "Journal of the Electrochemical Society", 122 No. 7 (1975), 955–962 and numerous other publications and in a number of patent specifications, for example German Offenlegungsschrift No. 2 603 200 (corresponding to U.S. Pat. No. 4,231,641). The previously-mentioned references contain numerous references to the other publications not mentioned here.

At high switching frequencies, electro-optical devices based on the aforementioned known electrochromic effect require relatively high power, for example about 100 times the normal value for liquid-crystal field effects at 1 Hz.

An object of the present invention is to produce an electro-optical cell which is based on an effect different from the known electrochromic effect, having the advantages without the disadvantages of the known electrochromic effect.

According to the present invention there is provided an electro-optical cell, containing an electrode which comprises an intercalatable layer structure.

In a preferred embodiment, the working electrode is made of graphite. The term "graphite" is meant to cover all known forms of graphite, for example highly-orientated pyrolytic graphite (HOPG), evaporated graphite, vitreous graphite and graphite foil (Grafoil, Sigraflex).

A layer structure is called "intercalatable" if foreign atoms or molecules can be inserted between the layers of starting material, generally by a chemical or electro chemical reaction. It is known, for example, that intercalated graphite compounds of the aforementioned kind can be used to obtain metal conductivities comparable with those of copper and aluminium. The optical properties of graphite are also greatly changed by intercalation. Intercalation is often brought about by gas-phase reactions (A. Herold, Bull. Soc. Chim. fr. 999 (1955)). Intercalation can also be brought about electrochemically (M. J. Bottomley et al, J. Chem. Soc. (1963) 5674).

In principle, there are two types of graphite intercalation compounds, namely donor and acceptor compounds. A donor compound is present if the intercalated substance releases electrons to the graphite; we are dealing with an acceptor substance if the intercalated compound receives electrons from the graphite. Examples of donor compounds are alkali, alkaline earth and rare-earth graphite intercalation compounds. Examples of acceptor compounds are transition metal halides, halogen and acid graphite intercalation compounds.

The invention is based on the fact that the optical reflection of a layer structure can be electrically controlled by electrochemical intercalation of foreign atoms. To this end, the layer structure can be partly intercalated in a preliminary operation. The colour effects can be varied, depending on the layer material, the foreign atoms used and the amount thereof. The optical change in the surface of the layer structure, which can be used for display purposes, consists in differences in the colour of an intercalated compound at different concentrations of intercalated foreign atoms, and in the colour differences between the intercalated and non-intercalated state. Since a single intercalation compound can usually give a number of colours, electro-optical displays of the aforementioned kind can also be used as multi-colour displays.

Foreign atoms can be injected into the layer structure from a wide variety of ion conductors in various states of aggregation. For example, liquid or solid electrolytes can be used and can either contain the ions required for intercalation or the ions can be introduced from a reservoir into the layer structure. The term "electrolyte" is used herein to include fills or pastes, e.g. various carbowaxes (PEG 200 - ca. 1500).

In order to intercalate the foreign atoms in the layer structure, an electric voltage or current is applied between the working electrode and the counter-electrode. The state of the working electrode can be checked by means of a reference electrode. To this end, electric leads are connected to the electrodes.

In order to display a particular pattern, for example a number or letter, the electrode or counter-electrode is segmented in conventional manner. Such methods of segmentation are known from the electrochromic cell and liquid crystal cell art.

The system comprising the electrodes, electrolyte and counter-electrode is generally disposed between two outer bearing plates which are connected along their edge and sealed if a liquid electrolyte is used. The bearing plates and the parts connecting them, for example spacers, and a seal, etc. are lumped together under the name "housing" for the purpose of this description.

Basically there are three different ways of operating a cell of the aforementioned kind, namely (a) The observer's side faces the boundary surface between the electrolyte and the working electrode, (b) The observer's side faces away from the boundary surface between the electrode and the working electrode, (c) The observer's sides are the free surfaces of the working electrode when in lateral contact with the electrolyte.

All the parts of the housing and conductors (the electrolyte and electrodes) between the observer and the working electrode must transmit light. Light-transmitting electrodes are known and comprise for example glass plates coated with $SnO_2$ or $InO_2$.

BRIEF DESCRIPTION OF THE DRAWINGS

For a better understanding of the present invention and to show how the same may be put into effect, reference will now be made, by way of example, to the accompanying drawings, in which.

DETAILED DESCRIPTION OF THE PREFERRED EMBODIMENTS

Figure 1:
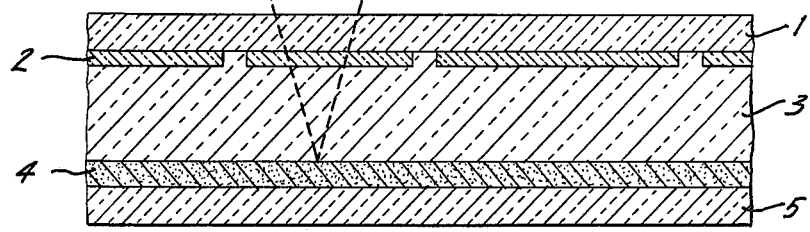
FIG. 1 shows a diagrammatical partial cross-sectional view of a display cell according to the invention, comprising a transparent electrolyte.

Referring now to the drawings, FIG. 1 shows a view in cross-section of part of an electro-optical display, which is bounded on the observer's side by a display glass 1 coated with a transparent electrode 2 made for example of indium oxide. Electrode 2 is segmented so as to represent a pattern. The individual segments have corresponding electrical leads (not shown).

The electrode is adjacent a layer of transparent electrolyte 3. The electrolyte consists of an organic solvent with one or several dissolved salts. The following are examples of suitable solvents, dimethoxyethane (DME), propylene carbonate (PC), tetrahydrofuran (THF), diethylene glycol-dimethyl ether (DIGLYME), dimethylformamide (DMF), hexamethylphosphorus triamide (HMTP), dimethylsulfoxide (DMSO) etc. The last named solvent has proved to be particularly advantageous. Metal salts of the alkali and alkaline-earth group are examples of suitable salts; such as salts of lithium, sodium, potassium, beryllium, barium, rubidium and caesium. Especially preferred are $LiNO_3$, $LiCl$, $LiClO_4$, $LiOOCCH_3$, $KPF_6$, $RbBr$. Anions with electron acceptor activity are, e.g. $HSO_4^-$, of $H_2SO_4$, $N_2O_5^-$ of $HNO_3$, $AsF_6^-$ of $KAsF_6$, $ClO_4^-$ of $LiClO_4$, $PF_6^-$ of $KPF_6$ etc.

On the other side, the electrolyte layer is bounded by a graphite electrode 4 connected as a cathode. The graphite electrode is a layer on a cover glass 5 which closes the system on the other side. There is a seal and a spacer between the edges of the two plates, although not shown in the drawing. The seal and spacer are constructed in similar manner to that known from other related cell technologies.

The graphite layer is partly intercalated in a preparatory operation, by applying a voltage of for example about 3.3 V for three hours. If the applied voltage is then increased to 3.8 V, the graphite layer 4 turns red-yellow after about 20 minutes. The display device is then ready for operation.

If a voltage pulse of 1.5 to 4 V is applied the colour can be reversibly varied between yellow, orange, red and black, depending on the polarity of the applied voltage. The peak currents are for example about 10 mA/cm$^2$, depending on the construction of the cell. The voltage is required only for switching a colour on and off, that is no voltage is required during the colour display, for periods of a few minutes to 10 minutes or more. The colour display can be maintained for longer periods (days) by voltage pulses at certain intervals.

Figure 2:
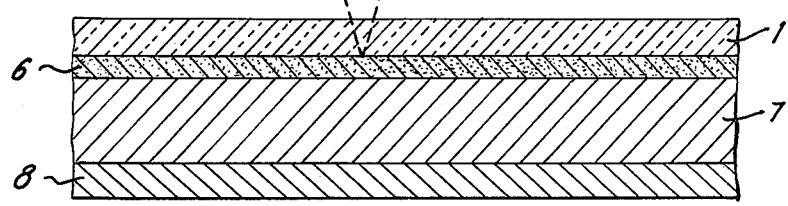
FIG. 2 shows a diagrammatical partial cross-sectional view of a cell for observation from the back, with a non-transparent electrolyte.

FIG. 2 shows a cross-sectional view of portions of a cell which, as previously mentioned, can be observed from the side remote from the electrolyte. To this end, the display glass 1 is coated with a thin graphite layer 6 and the graphite layer has been previously intercalated during the manufacturing process.

The graphite layer is adjacent a layer of non-transparent electrolyte 7, which can be made more particularly of solid supraionic conductors, for example $Li_3N$ or Li-$\beta$-aluminate. On the other side, the electrolyte is bounded by a metal layer 8 serving as an ion reservoir. For display purposes, either the graphite layer 6 or the metal layer 8 can be suitably segmented.

The contacts between the graphite and ionic conductor or between the ionic conductor and the metal are preferably made in a high vacuum of $10^{-6}$ Torr or in very pure argon. A high-vacuum argon chamber of stainless steel (not shown) was used in the present case.

The metal in contact with the ion conductor is connected as an anode and, as mentioned, supplies foreign atoms for injecting into the graphite layer. In this embodiment, the boundary surface between the graphite layer and the display glass becomes coloured when a suitable voltage is applied.

Figure 3:
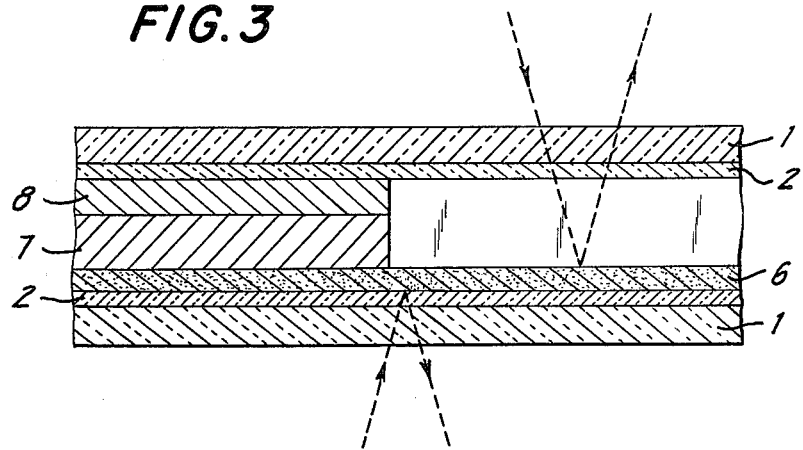
FIG. 3 shows a diagrammatical partial cross-sectional view of a cell which can be observed from both sides.

FIG. 3 shows an alternative embodiment comprising a solid electrolyte. The cell is observable from both sides and comprises two transparent bearing plates 1 internally coated with transparent electrode layers 2. A graphite layer 6 is deposited on one plate above the electrode. A layer 7 of a solid supraionic conductor ($Li_3N$ in the present case) is adjacent the graphite layer. As before, a metal lithium layer 8 is provided as an ion reservoir. The opaque solid electrolyte 7 only partly covers the graphite layer, so that observation is possible from both sides.

Owing to the simple, reliable structure and operation, the relatively very cheap (at today's prices) starting materials and, more particularly, the lower power consumption, the invention is applicable to all kinds of displays, more particularly for large-area displays. The invention is particularly important for multi-colour electro-optical displays, but the properties of the device according to the invention may also advantageously be used for small displays, for example for clocks, computers, instruments or the like, or video displays. The invention is also particularly suitable for multicolour displays.

We claim:

1. An electro-optical cell which comprises a working electrode having electrically controllable optical properties, a counter-electrode, an electrolyte disposed between the two electrodes and means for applying an electric voltage or electric current to the cell, the working electrode having an intercalated graphite layer structure.

2. An electro-optical cell according to claim 1, wherein the electrolyte is transparent.

3. An electro-optical cell according to claim 1, wherein the electrolyte is not transparent.

4. An electro-optical cell according to claim 1, wherein the electrolyte is solid.

5. An electro-optical cell according to claim 4, wherein the electrolyte is a supraionic conductor.

6. An electro-optical cell according to claim 5, wherein the electrolyte is in contact with a metal ion reservoir.

7. An electro-optical cell according to claim 5, wherein the electrolyte comprises $Li_3N$ or Li-$\beta$-aluminate.

8. An electro-optical cell according to claim 1, wherein the electrolyte is liquid.

9. An electro-optical cell according to claim 8, wherein the liquid electrolyte comprises at least one organic solvent and one or more dissolved salts.

10. An electro-optical cell according to claim 9, wherein the liquid electrolyte comprises a K, Na, Li, Be or Ba salt dissolved in dimethyl sulphoxide.

11. An electro-optical cell according to claim 1, 2 or 3, wherein the electrolyte is a gel or paste.

12. An electro-optical cell according to claim 1, wherein the graphite layer structure is intercalated by an electron donor substance.

13. An electro-optical cell according to claim 12, wherein the donor substance is a metal, a mixture of metals or a metal compound.

14. An electro-optical cell according to claim 13, wherein the donor substance is an alkali metal or alkaline earth metal.

15. An electro-optical cell according to claim 14, wherein the metal is lithium, sodium or potassium.

16. An electro-optical cell according to claim 13, wherein the metal is rubidium or caesium.

17. An electro-optical cell according to claim 1, wherein the graphite layer structure is intercalated by an electron acceptor substance.

18. An electro-optical cell according to claim 17, wherein the acceptor substance includes at least one halogen or halogen compound.

19. An electro-optical cell according to claim 17, wherein the acceptor substance includes at least one acid or salt.

20. An electro-optical cell according to claim 1, wherein the counter-electrode transmits light.

21. An electro-optical cell according to claim 1, wherein the working electrode is intercalated through the entire thickness of the layer, so that colour reaction thereof is, in use, visible at the back.

22. An electro-optical according to claim 1, wherein the working electrode is segmented.

23. An electro-optical cell according to claim 1, wherein the counter-electrode is segmented.

24. An electro-optical cell according to claim 1, wherein a reference electrode is provided in addition to the working electrode and the counter-electrode.

* * * * *